Figure 1:
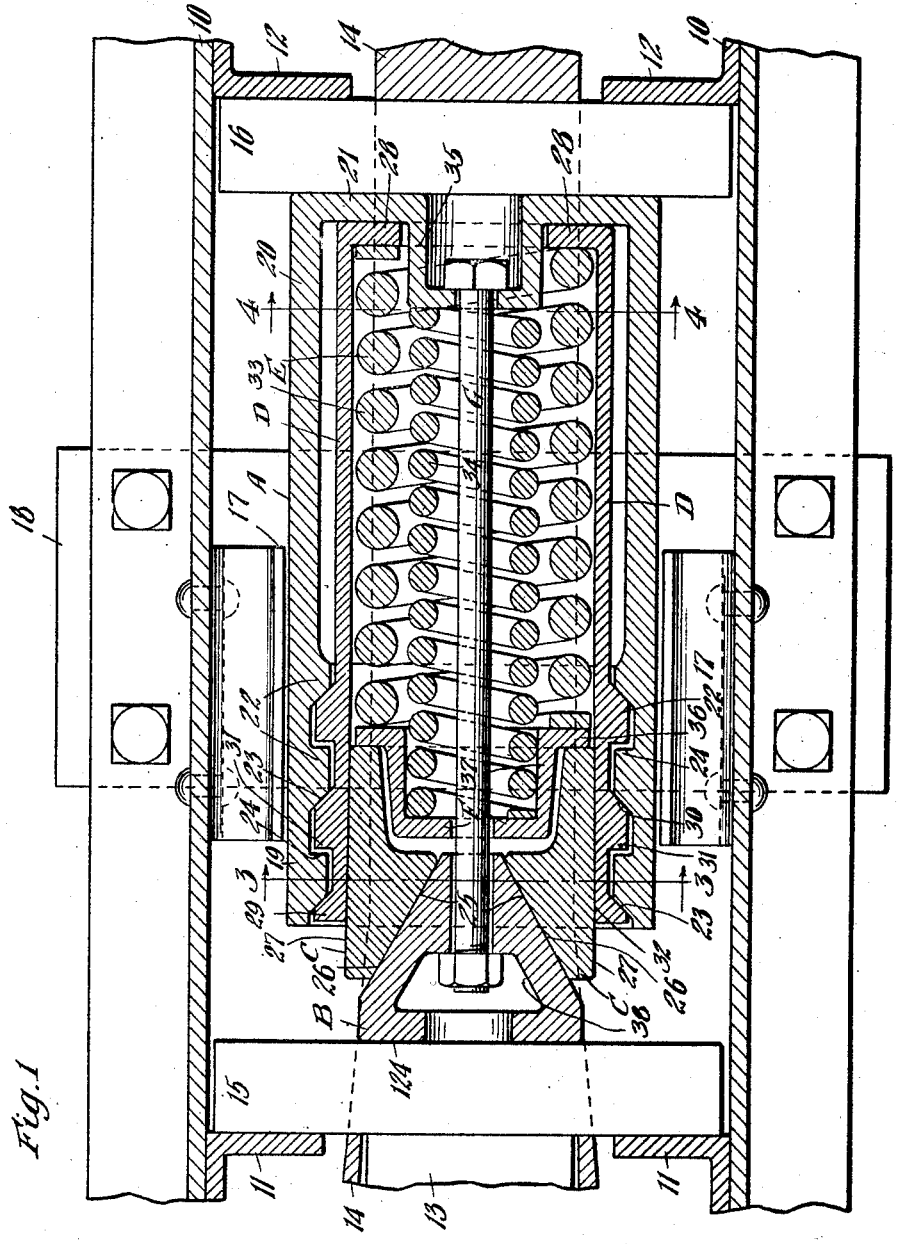

Feb. 16, 1926.                                                    1,573,118
                    J. F. O'CONNOR
           FRICTION SHOCK ABSORBING MECHANISM
                Filed March 12, 1923          2 Sheets-Sheet 1

Witnesses
Wm. Geiger

Inventor
John F. O'Connor
By George S. Haight
   His Atty

Feb. 16, 1926.
J. F. O'CONNOR
FRICTION SHOCK ABSORBING MECHANISM
Filed March 12, 1923   2 Sheets-Sheet 2
1,573,118
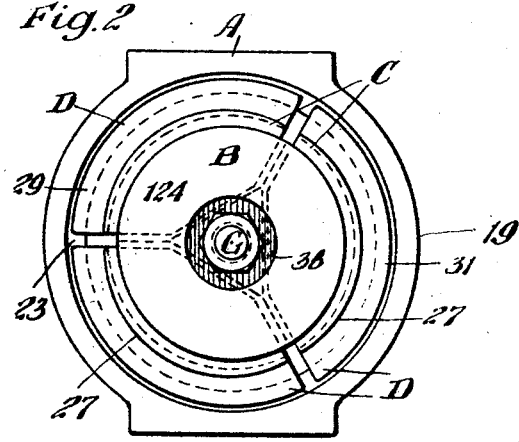
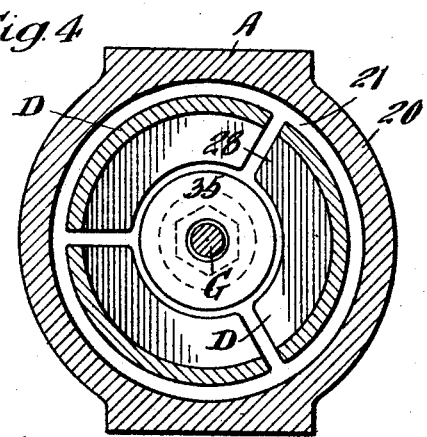
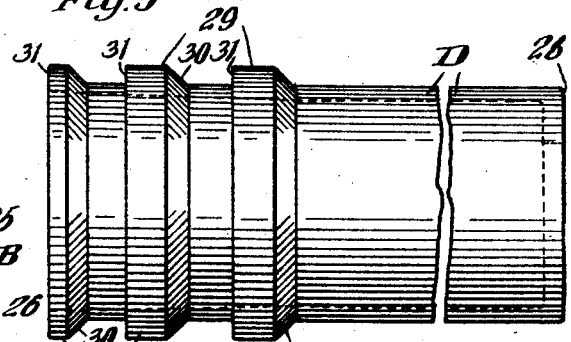
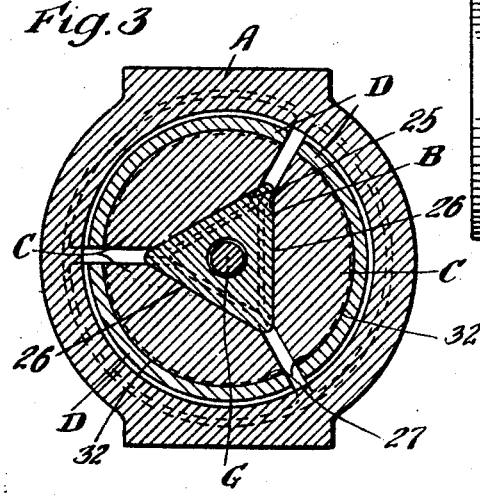
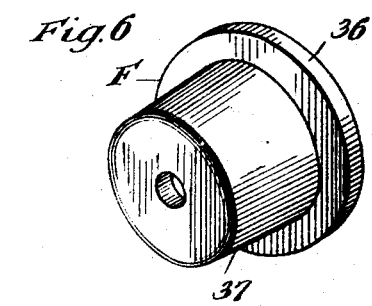
Witnesses
Wm. Guiger
Inventor
John F. O'Connor
By George S. Haight
His Atty Patented Feb. 16, 1926.

1,573,118

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed March 12, 1923. Serial No. 624,312.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a simple and efficient, high capacity friction shock absorbing mechanism, particularly adapted for railway draft riggings, wherein a differential wedge action is had.

A more specific object of the invention is to provide a mechanism of the character indicated, wherein are employed a pressure-transmitting wedge; a plurality of friction shoes co-acting with the wedge; a plurality of tapering liners co-acting with the friction shoes; and a shell co-acting with the liners, the shell and liners having co-acting wedge faces, whereby a differential wedge action is had, due to the tapering of the liners, and the liners are moved outwardly of the shell on the wedge faces thereof, opposed by the spring resistance.

Other objects and advantages of the invention will more clearly appear from the description and claims hereinafter following.

In the drawing forming a part of this specification, Figure 1 is a longitudinal sectional view of a portion of a railway draft rigging, the section through the shell and friction elements therewithin corresponding to two section planes at approximately 120° apart. Fig. 2 is a front end elevational view of the shock absorbing mechanism proper. Fig. 3 is a transverse vertical sectional view corresponding to the line 3—3 of Fig. 1. Fig. 4 is a transverse vertical sectional view corresponding to the section line 4—4 of Fig. 1. Fig. 5 is a side elevational view of one of the tapering liner elements, and Fig. 6 is a perspective view of the spring follower cap.

In said drawing, 10—10 indicate channel shaped center or draft sills of a car under frame, to the inner faces of which are secured front stop lugs 11 and rear stop lugs 12. A portion of the draw-bar is indicated at 13, the same having operatively associated therewith a hooded yoke 14 of well known form, and within which is disposed the shock absorbing mechanism proper, hereinafter described, a front main follower 15 and a rear follower 16. The friction shock absorbing mechanism proper, illustrated in the drawing, is of that type employing a substantially cylindrical combined shell and spring cage, and in order that it be maintained in proper central position, the draft sills 10 may have secured to the inner faces thereof, guide plates 17—17. The yoke and parts contained therein are supported in operative position by a detachable saddle plate 18.

The improved shock absorbing mechanism proper, as shown, comprises a combined shell and spring cage casting A; a pressure-transmitting wedge B; three friction shoes C—C; three liner sections D; a spring resistance element E; a spring follower F; and a retainer bolt G.

The casting A is of generally cylindrical form, having the cylindrical wedge shell proper 19 formed at the front end thereof. Rearwardly of the wedge shell proper, the casting provides a cylindrical spring cage or casing 20 and at its rear end the casting A has an integral transverse wall 21 abutting the rear follower 16. The wedge shell proper, as clearly shown in Fig. 1, is formed with three, spaced apart, annular ribs 22 at the front end thereof, provided with inwardly, converging, relatively blunt, wedge faces 23 on the front sides thereof. The flat faces at the rear sides of the ribs form transversely extending shoulders 24.

The wedge B, through which pressure is transmitted, is in the form of a hollow casting having a front transverse bearing face 124 adapted to abut the front follower 15. At its inner end, said wedge B is provided with three, inwardly converging, relatively keen, wedge faces 25, as best shown in Figs. 1 and 3, disposed around the center or axis of the wedge and giving the wedge the appearance of a truncated, triangular pyramid of regular form.

The friction shoes C are three in number, and are arranged in an annular series surrounding the wedge B. Each of the friction shoes C is provided with an inner, flat wedge face 26 adapted to co-act with one of the faces 25 of the wedge B, and an outer true cylindrical face 27 adapted to co-act with one of the liner sections D, as hereinafter described.

The liner sections D, three in number, are arranged in an annular series, each extending through an arc of approximately 120°. Each of the liner sections D is formed at its rear end with a flange 28 adapted to normally abut the rear wall 21 of the shell A. At the front end, each of the liner sections is provided with three, spaced, exterior annular ribs 29. The ribs 29 are each provided with a rear wedge face 30 adapted to co-act with the wedge face 23 of one of the ribs 22 of the shell A. The flat faces at the front sides of the ribs form transversely extending shoulders 31 spaced from the shoulders 24 of the ribs 22, to permit outward movement of the liner sections D, said spacing being greater than the full movement of the sections, so that the shoulders will be out of contact when the gear is fully compressed. On the inner side, each liner, near the outer end thereof, is provided with a true cylindrical friction face 32 adapted to co-act with the outer cylindrical face 27 of one of the friction shoes C. As clearly shown in Fig. 1 the cylindrical friction surfaces 32 of the liners D converge slightly inwardly from the front end toward the rear end thereof.

The spring resistance E, as shown, comprises a relatively heavy, outer, coiled spring 33 bearing on the flanges 28 of the liner sections D, and an inner, relatively lighter, coiled spring 34 bearing at its rear end on the hollow cup-like boss 35 formed integral with the rear wall 21 of the shell A.

The spring follower or cap F is of generally cup-shaped form having a heavy annular flange 36 on the inner side of which is adapted to bear on the front end of the outer coiled spring 33. The spring follower or cap G has a forwardly extended interior cup-shape section 37, the interior of which provides a bearing for the front end of the inner coiled spring 34.

The retainer bolt G is anchored at its rear end within the boss 35 and at its forward end within a suitable recess 38 within the wedge B, the cap F and wedge B being suitably apertured to accommodate the shank of the bolt. Said bolt not only serves to maintain the parts assembled, but is also utilized to adjust the parts to the proper over-all length, maintain them in this position under full release, and to place the spring under initial compression.

As clearly shown in Fig. 1, the liner sections D are normally held with their inner ends abutting the rear wall 21 of the shell A by means of the outer coiled spring 33 which bears at one end on the flanges 28 of the liners D, and yieldingly resists outward movement of the liner sections with reference to the shell A.

The operation of the device, assuming a buffing or compressive action being applied to the draft rigging, is as follows. As the wedge B is forced inwardly of the shell, a wedging action will be set up between the same and the friction shoes C. Upon further inward movement of the wedge B, the friction shoes C will be moved inwardly therewith, sliding on the friction surfaces 32 of the liner sections C. As the surfaces 32 of the liner section C converge slightly inwardly, the liner sections will be forced radially, outwardly, causing the wedge faces 30 thereof to slide on the wedge faces 23 of the shell A. This relative sliding movement of the wedge faces 30 and 23 will cause the liner sections to move longitudinally of the shell in an outward direction, against the resistance of the spring 33, moving the flanges 28 of the sections D away from the rear wall of the shell A. This differential wedging action will continue until the mechanism has been fully compressed.

During draft, the action of the mechanism is similar to that just described with the exception that the rear follower 16 is moved toward the front follower 15, which remains stationary.

Upon removal of the actuating or compressing force, the parts will all be restored to their initial position by the spring resistance E, the coiled spring 33 returning the liner sections D to normal position with the flanges 28 thereof abutting the rear wall 21 of the friction shell, and the springs 33 and 34 together returning the friction shoes C and the wedge B to normal position.

As heretofore described, the spring is held under initial compression so that, as wear occurs on any of the co-operating surfaces of the shell, liners or shoes, automatic compensation is made by the spring expanding gradually outward, it being noted that ample clearance is left for this purpose between the spring cap and the inner end of the pressure wedge.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a follower acting shell; of a spring resistance; tapering friction elements within the shell, said elements and shell having co-acting wedge faces; a plurality of friction shoes co-acting with said elements, said shoes being movable inwardly of the shell during compression of the mechanism; and a wedge pressure creating means co-acting with the shoes for spreading the same apart and forcing the same inwardly of the shell during a compression stroke.

2. In a friction shock absorbing mechanism, the combination with a follower acting shell; of a spring resistance; a plurality of friction elements within the shell, said shell and elements being provided with wedge faces; a plurality of friction shoes co-acting with said elements; and pressure-transmitting means for forcing said shoes inwardly of the shell during a compression stroke, said last named means having wedging engagement with said shoes.

3. In a friction shock absorbing mechanism, the combination with a plurality of liner elements; of a plurality of friction shoes co-acting with said elements; a spring resistance interposed between said shoes and elements; a shell enclosing said elements, shoes and spring resistance, said shell and elements being provided with co-acting wedge faces; and wedge pressure-transmitting means co-acting with said shoes.

4. In a friction shock absorbing mechanism, the combination with a shell; of a plurality of longitudinally movable liner elements within the shell; a spring resistance within the shell; friction wedge pressure-creating means co-acting with said elements; and means for effecting outward movement of said elements with reference to the shell during compression of the mechanism.

5. In a friction shock absorbing mechanism, the combination with a shell; of longitudinally movable liner elements within the shell; a spring resistance; wedge pressure-creating means; and differential wedge acting means effecting outward movement of said elements during the compression stroke of the mechanism.

6. In a friction shock absorbing mechanism, the combination with a shell; of liner elements movably received within said shell; a spring resistance within said shell; friction wedge pressure-creating means co-acting with said elements; and co-acting means on said shell and elements for effecting outward longitudinal movement of said elements with reference to the shell upon compression of the mechanism.

7. In a friction shock absorbing mechanism, the combination with a shell having wedge faces on the interior thereof; of a tapered liner element having wedge faces co-acting with the wedge faces of said shell, said liner element being movable longitudinally of the shell; a friction shoe co-acting with said liner element; a wedge co-acting with said shoe; and a spring resistance interposed between said shoe and said element.

8. In a friction shock absorbing mechanism, the combination with a shell provided with interior wedge faces; a plurality of longitudinally movable, tapering liner elements, having the rear ends thereof normally abutting the rear end of said shell, said elements being provided with wedge faces co-acting with the wedge faces of the shell; a plurality of friction shoes co-acting with said liners; a wedge co-acting with said shoes; and a spring resistance interposed between the rear ends of the shoes and the rear ends of said liner elements tending to hold said elements seated against the end wall of the shell.

9. In a friction shock absorbing mechanism, the combination with a shell provided with interior, blunt, wedging faces; a plurality of longitudinally movable liner elements having the rear ends thereof normally abutting the rear ends of the shell, said elements being provided with blunt wedge faces co-acting with the wedge faces of the shell; a plurality of friction shoes co-acting with said liners; a wedge co-acting with said shoes, said wedge and shoes having relatively keen co-acting wedge faces; and a spring resistance interposed between the rear ends of the shoes and the rear ends of said liner elements tending to hold said elements seated against the rear wall of the shell.

10. In a friction shock absorbing mechanism, the combination with a shell; of tapered friction elements within the shell, said elements and shell being provided with co-acting, blunt, wedge faces; a plurality of friction shoes co-acting with said elements; a wedge co-acting with said shoes, said wedge and shoes being provided with co-acting keen wedge faces; and a spring resistance co-acting with said shoes and tapering elements.

11. In a friction shock absorbing mechanism, the combination with a shell provided with interior blunt wedge faces; of a plurality of liner elements within the shell, said elements being provided with interior, slightly converging, friction surfaces, and exterior, blunt, wedge faces co-acting with the wedge faces of the shell; a plurality of friction shoes provided with outer friction surfaces adapted to co-act with the friction surfaces of the liner elements, said shoes being also provided with interior, relatively keen, wedge faces; a keen angle wedge co-acting with said shoe wedge faces; and a spring resistance interposed between the rear ends of the friction shoes and the tapering liner elements.

12. In a friction shock absorbing mechanism, the combination with a multiple part friction shell having interior friction surfaces and with the parts so arranged that the distance between said surfaces may be increased by expansion of certain of said parts during a compression of the mechanism; of an expansible multiple part friction unit co-operable with and sliding within said shell; and spring means yieldingly resisting expansive movement of said last named parts of the shell, and yieldingly resisting movement between the shell and said unit.

In witness that I claim the foregoing I have hereunto subscribed my name this 8th day of March 1923.

JOHN F. O'CONNOR.